(No Model.)
T. S. BROWN.
BACK FOR VEHICLE SEATS.
No. 450,446. Patented Apr. 14, 1891.
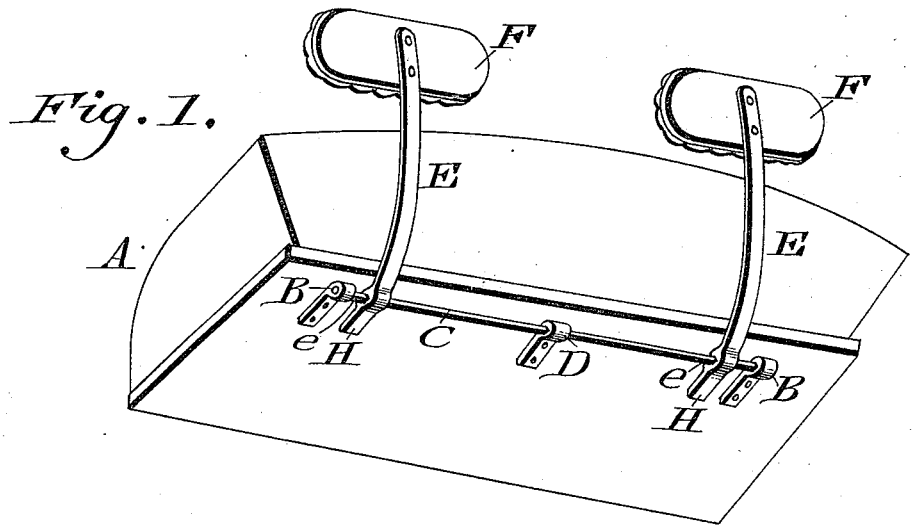
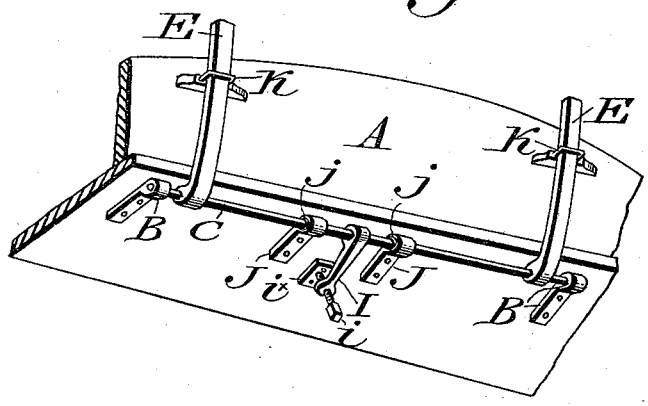
WITNESSES:
Frank Quinn
John R. Nolan
INVENTOR
Thomas S. Brown
BY Shawbridge & Taylor
ATTORNEYS

UNITED STATES PATENT OFFICE.

THOMAS S. BROWN, OF POUGHKEEPSIE, NEW YORK.

BACK FOR VEHICLE-SEATS.

SPECIFICATION forming part of Letters Patent No. 450,446, dated April 14, 1891.

Application filed September 3, 1890. Serial No. 363,809. (No model.)

*To all whom it may concern:*

Be it known that I, THOMAS S. BROWN, a citizen of the United States, residing at Poughkeepsie, in the county of Dutchess, and State of New York, have invented an Improvement in Backs for Vehicles and other Seats, of which the following is a specification.

My invention relates to vehicle or other seats the backs of which are capable of independent movement, and its object is to improve the connection between such seats and their backs by the employment of torsion springs which tend to maintain such backs always in proper position, and against the stress of which rearward movements of said backs must be effected.

In the drawings I show, and herein I describe, a good form of a convenient embodiment of my invention, the particular subject-matter claimed as novel being hereinafter definitely specified.

In the drawings, Figure 1 is a view in perspective of the rear and under portions of a vehicle seat, embodying my invention. Fig. 2 is a fragmentary view in perspective of the rear and under portions of a seat provided with a modified form of connection embodying my invention.

Similar letters of reference indicate corresponding parts.

In the drawings, A indicates a vehicle seat which happens to be of a box-like form, but my invention is applicable to seats of any ordinary form and arrangement.

B B are a pair of metal brackets or holders secured to the seat, each near one of the respective ends of the latter, and conveniently upon its under surface,—and C is what I term a torsion bar, being a rod of resilient metal preferably of polygonal cross section, the respective extremities of which are entered within eyes in the brackets B B, and are preferably provided with suitable bushings so as to be free for rotative movement therein.

D, Fig. 1, is a bracket secured to the seat in line with and about midway between the brackets B B, and provided with a polygonal eye corresponding to the cross sectional form of the bar C, in which eye the central portion of said bar C is held.

E E are what I term the back standards, each of which consists of a strip of metal, and each of which is as to its lower portion formed with an eye $e$ of size and shape corresponding to the cross-section of the bar C. The said standards are mounted by means of their eyes each upon one of the end portions of the bar C, are carried up to a proper height, and are equipped at their ends with a cushioned or other back proper, F, which of course may be a single structure supported upon both standards, or may be formed in parts and supported one upon each standard, as shown in the drawings.

When pressure is brought to bear against a back F, as by the weight of the person occupying the seat, said pressure carries the back and back standard together rearwardly, and said standard in said rearward movement by its clasp upon the bar C, twists said bar upon its axis, and this torsion of the bar C thereupon in turn reacts, and tends to force said back and back standard forward and into their normal position. At all times when the back and standards are in their upright or normal position said bar C is in the construction shown in Fig. 1, untwisted and in its natural condition.

The torsion bar C is a compact, neat, and readily applied form of spring, particularly adapted for the purpose described, and, being normally as stated relieved of torsion, or subject only to slight torsion, retains undiminished for a long period its full measure of resilience. The bracket D of Fig. 1, by its clasp upon the bar C, retains said bar fixedly against rotation, the rearward movement of either seat only twisting the bar between the base of its own standard, and said bracket,—and also serves to prevent the movement of one standard from being transmitted to the other.

It is obvious that the comparative ease with which the backs may be moved rearwardly against the stress of the torsion bar may be controlled by moving the standards nearer to or farther from the bracket.

The standards themselves are in the form of the device shown, formed as quadrangular bars of metal, and I prefer to so form them, and to rely for the spring action of the backs entirely upon the torsion bar. If preferred, however, the resilience of the torsion bar may be supplemented by some degree of flexibility in the standards themselves.

In order to limit the backward movement of the seat backs, I provide stops of any desired character, a good form which I have devised, however, being that shown in Fig. 1, in which the lower extremities of the standards are equipped with extensions H H which project forwardly beneath the seat and are moved upward as the seat is forced back, said extensions being set at such angle that they encounter the bottom of the seat when the back has reached the limit of its predetermined backward movement.

In the construction shown in Fig. 2 I illustrate backs, back standards, torsion bar, and end supporting brackets for said bar, and also show an arm I embodying a squared eye by which it is fitted to and mounted upon the central portion of the bar C, which arm I is at its outer extremity equipped with a screw $i$, the end of which is engaged in a plate $i^x$ secured in proper position beneath the seat. By the manipulation of said screw $i$ the arm I is set toward or away from the plate $i^x$ and thereby the normal axial set of said bar may be regulated at will. In said Fig. 2 J J are a pair of brackets secured in position on the bottom of the seat, one on each side of the arm I, which brackets each embody a circular eye, in each of which eyes is fitted a bushing $j$ of circular exterior to fit said eye but of polygonal interior to receive the bar C. Said brackets are designed merely to support the bar, which, with its bushings $j$, is free to turn within them. In the construction shown in said Fig. 2 I provide a pair of keepers K K, in the nature of inclosing staples, and secure them to the back of the seat, one controlling each standard, and these keepers are of proper size to permit the required play of said standards.

Having thus described my invention, I claim:

1. In combination, a seat, a torsion rod mounted on said seat, and a back the lower portion of which is engaged with said rod, substantially as set forth.

2. In combination with a seat, a back, a supporting standard upon which said back is mounted, which standard is connected with a torsion spring mounted upon the seat, and a device for limiting the movement of said seat, substantially as set forth.

3. In combination with a seat, a torsion rod supported upon said seat, and a seat standard mounted upon and keyed or otherwise secured to said rod, substantially as set forth.

4. In combination with a seat, a torsion rod mounted in horizontal position and held against rotation by a supporting device, a vertical back standard mounted upon said torsion rod and supporting a seat back, substantially as set forth.

5. In combination with a seat, a torsion rod mounted in horizontal position and held against rotation by a suitable support, a vertical back standard mounted upon said torsion rod and supporting a seat back, and a stop to limit the movement of said seat and standard, substantially as set forth.

6. In combination with a seat, a torsion rod mounted in and held against rotation by a supporting device, a vertical back standard secured upon said torsion rod, the lower portion of which standard below the rod is bent so as to in the movement of the standard encounter the bottom of the seat or other stop, substantially as set forth.

7. In combination with a seat, a horizontal polygonal torsion bar mounted in a pair of brackets, a device attached to the central portion of said bar to retain it in a given axial position and a pair of back standards each of which is by means of an eye corresponding in cross section to the polygonal rod mounted upon said rod and each upon one end portion of the same, substantially as set forth.

8. In combination the seat A, the rod C, brackets B and D, standards E, and backs F, substantially as set forth.

9. In combination, the seat A, the rod C, brackets B and D, standards E, extensions H, and backs F, substantially as set forth.

In testimony that I claim the foregoing as my invention I have hereunto signed my name this 18th day of August, A. D. 1890.

THOS. S. BROWN.

In presence of—
ROBERT F. WILKINSON,
JENNIE H. CARMAN.